(12) United States Patent
Iida

(10) Patent No.: US 7,768,727 B2
(45) Date of Patent: Aug. 3, 2010

(54) OPTICAL LENS BARREL AND IMAGE PICKUP APPARATUS

(75) Inventor: Seiji Iida, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/357,132

(22) Filed: Jan. 21, 2009

(65) Prior Publication Data

US 2009/0185300 A1  Jul. 23, 2009

(30) Foreign Application Priority Data

Jan. 22, 2008  (JP) .............................. 2008-011662

(51) Int. Cl.
G02B 7/02 (2006.01)
(52) U.S. Cl. ...................... 359/826; 359/819
(58) Field of Classification Search ......... 359/694–700, 359/819–826
See application file for complete search history.

(56) References Cited

U.S. PATENT DOCUMENTS 5,523,892 A * 6/1996 Yoshibe et al. .............. 359/819

FOREIGN PATENT DOCUMENTS

JP  2006-098486 A  4/2006

* cited by examiner

*Primary Examiner*—Mohammed Hasan
(74) *Attorney, Agent, or Firm*—Rossi, Kimms & McDowell LLP

(57) ABSTRACT

A lens barrel includes front, intermediate, and rear barrels that hold front, intermediate and rear lens group, respectively. The relative distances among the barrels vary. The front barrel includes a lens barrier and a barrier actuating member. A barrier drive cam section rotates the barrier actuating member upon relative movement of the barrels. The intermediate barrel includes a first drive source for driving a shutter unit, a second drive source for driving a light amount control unit, and a third drive source for driving the intermediate lens group for image stabilization. The intermediate barrel has a rear lens group clearance section at an outer peripheral portion to avoid interference with a driving mechanism for the rear lens group, and a barrier clearance section adjacent to the first or second drive source in a peripheral portion to avoid interference with the barrier actuating member and the barrier drive cam section.

4 Claims, 13 Drawing Sheets

OPTICAL LENS BARREL AND IMAGE PICKUP APPARATUS

BACKGROUND OF THE INVENTION

1. Field of the Invention

The present invention relates to an optical lens barrel and an image pickup apparatus including the optical lens barrel.

2. Description of the Related Art

Conventionally, the tip of the lens barrel (optical lens barrel) of a compact camera is provided with lens barriers (hereinafter, referred to as "barriers") that automatically open/close to protect the lens during the camera being not used. For a common barrier driving method, movement of the lens barrel in the optical axis direction is converted to movement in the turning direction to make a barrier driving member turn around the optical axis, thereby opening/closing the barriers. A typical configuration is shown in, for example, FIG. 5 in Japanese Laid-Open Patent Publication (Kokai) No. 2006-098486.

This mechanism is configured so that, when an actuating member moves in the optical axis direction and a cam surface of the actuating member abuts on a cam section included in a base member, the actuating member turns around the optical axis.

This mechanism has advantages in that: the cam section extends out from a fixed member, easily ensuring a sufficient strength; and backlash occurs in the actuating member, suppressing loss in driving force transmission and variation in timing.

Normally, an intermediate barrel, which has a shutter and a diaphragm (or ND filter), is located between a front barrel that holds the barrier mechanism and the base member. The aforementioned cam section extends through this intermediate barrel, and thus, the shutter and the diaphragm are inevitably arranged in positions avoiding the cam section, resulting in limitation on the degree of freedom of design.

Also, conventionally, a rearmost lens group is often used as a focusing lens that moves in the optical axis direction. A guiding member and a feed screw for moving the focusing lens extend in the optical axis direction in the rearmost barrel that holds the focusing lens. Thus, when the intermediate barrel moves toward the focusing lens to reduce the entire lens barrel length during the camera being not used, the aforementioned guiding member and feed screw overlap with the intermediate barrel. Therefore, a clearance structure is provided at a part of the intermediate barrel, and no other mechanism parts can be arranged at that part.

In addition, in recent years, an image stabilization mechanism that stabilizes an image moved due to hand shake by moving a part of the lens in the direction to cancel the movement out is often employed. However, since such image stabilization mechanism is also arranged in the aforementioned intermediate barrel, it becomes further difficult to make a compact layout of the respective components.

Meanwhile, another barrier driving method in which turning movement of a rotation cylinder included in a lens barrel is transmitted to an actuating member to drive the actuating member to turn is also conventionally employed. This method has a problem in that large transmission loss occurs in the system for transmitting a driving force from a drive source (motor) to the rotation cylinder and also large backlash occurs, resulting in variation in drive timing easily occurring.

Accordingly, as mentioned above, there is a demand to efficiently lay out a shutter, a diaphragm and an image stabilization mechanism to achieve downsizing in a system in which a fixed member directly drives an actuating member to turn.

SUMMARY OF THE INVENTION

The present invention provides an optical lens barrel and an image pickup apparatus, which can provide a layout enabling the lens barrel to be kept compact white including a diaphragm mechanism, a shutter mechanism and an image stabilization mechanism in an intermediate barrel.

Accordingly, the present invention provides an optical lens barrel including a front barrel, an intermediate barrel and a rear barrel that hold a front optical lens group, an intermediate optical lens group and a rear optical lens group, respectively, the relative distances in the direction of an optical axis among the front barrel, the intermediate barrel and the rear barrel varying between during the optical lens barrel being housed and during shooting, the optical lens barrel comprising a lens barrier arranged in the front barrel and adapted to open/close by moving between a position to cover a front surface of the front lens group and a position to retract, a barrier actuating member arranged in the front barrel and adapted to drive the lens barrier to open/close; a barrier drive cam section adapted to make the barrier actuating member turn around the optical axis upon relative movement of the front, intermediate and rear barrels, a first drive source arranged in the intermediate barrel and adapted to drive a shutter unit adapted to open/close by moving between a position to block a light flux passing through the respective lens groups and a position to allow the light flux to pass through, a second drive source arranged in the intermediate barrel and adapted to drive a light amount control unit adapted to increase/decrease the light amount of the light flux for adjustment, a third drive source arranged in the intermediate barrel and adapted to drive the intermediate lens group in a direction perpendicular to the optical axis for image stabilization, a rear lens group clearance section formed at an outer peripheral portion of the intermediate barrel and provided to avoid interference with a mechanism that moves the rear lens group, during the optical lens barrel being housed; and a barrier clearance section formed adjacent to the first drive source or the second drive source in a peripheral portion of the intermediate barrel and provided to avoid interference with the barrier actuating member and the barrier drive cam section.

Accordingly, the present invention provides an image pickup apparatus comprising the above-described optical lens barrel.

The optical lens barrel according to the present invention can provide a layout enabling the lens barrel to be kept compact while including a diaphragm mechanism, a shutter mechanism and an image stabilization mechanism in an intermediate lens group.

The features and advantages of the invention will become more apparent from the following detailed description taken in conjunction with the accompanying drawings.

DETAILED DESCRIPTION OF THE PREFERRED EMBODIMENTS

Hereinafter, embodiments of the present invention will be described in details with reference to the drawings.

Figure 1:
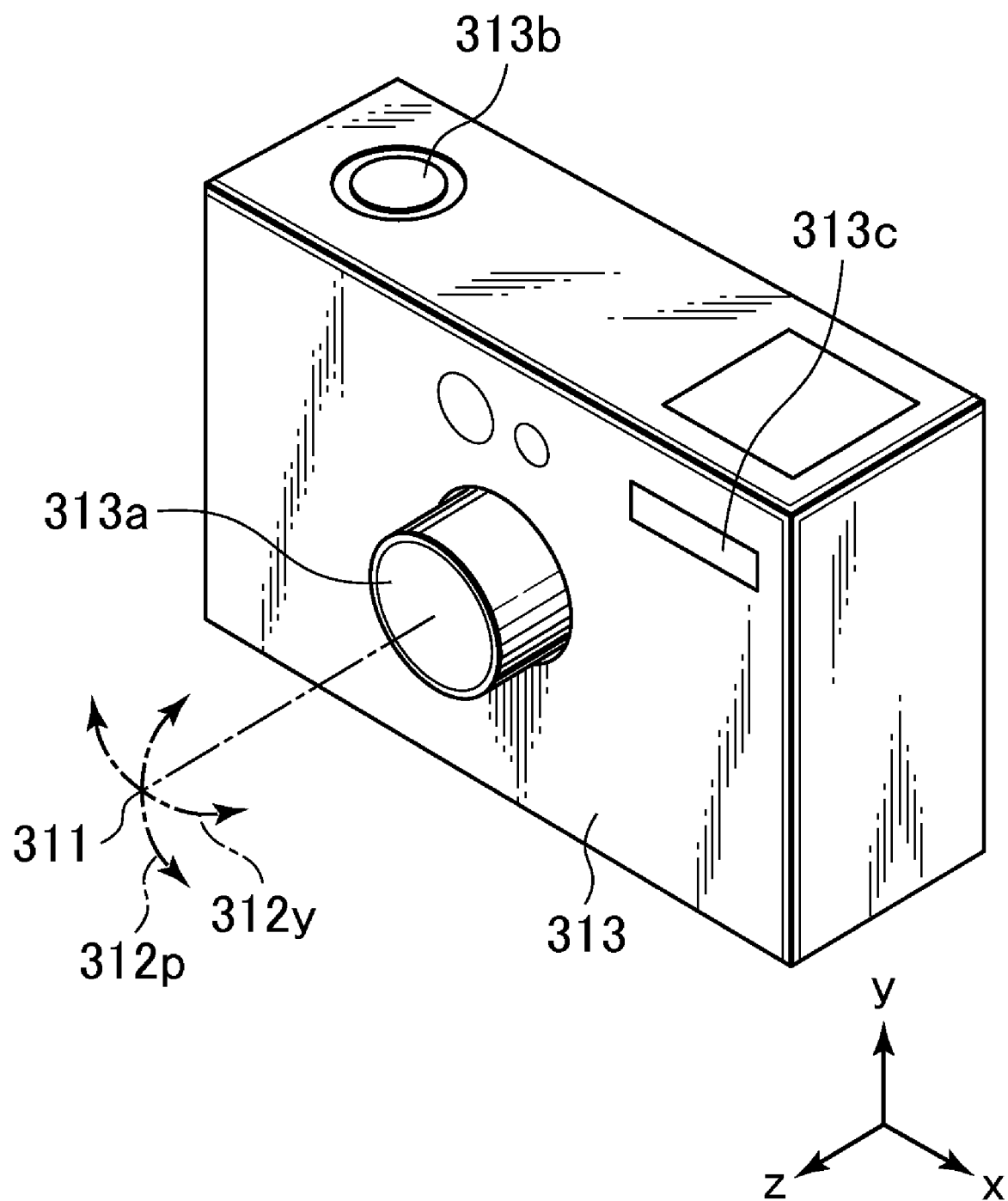
FIG. 1 is an appearance diagram of a digital camera as an image pickup apparatus according to an embodiment of the present invention.

FIG. 1 is an appearance diagram of a digital camera as an image pickup apparatus according to an embodiment of the present invention.

The digital camera includes an image stabilization mechanism that stabilizes an image against vertical and horizontal movements of the camera indicated by arrows 312$p$ and 312$y$ relative to a photographing optical axis 311. Here, a camera body 313 includes a lens barrel 313$a$ that holds a shooting lens, a shutter release button 313$b$ and a lighting device 313$c$. The back surface of the camera body 313 is provided with a liquid-crystal monitor, enabling viewing an image of a subject taken by an image sensor, which will be described later.

Figure 2:
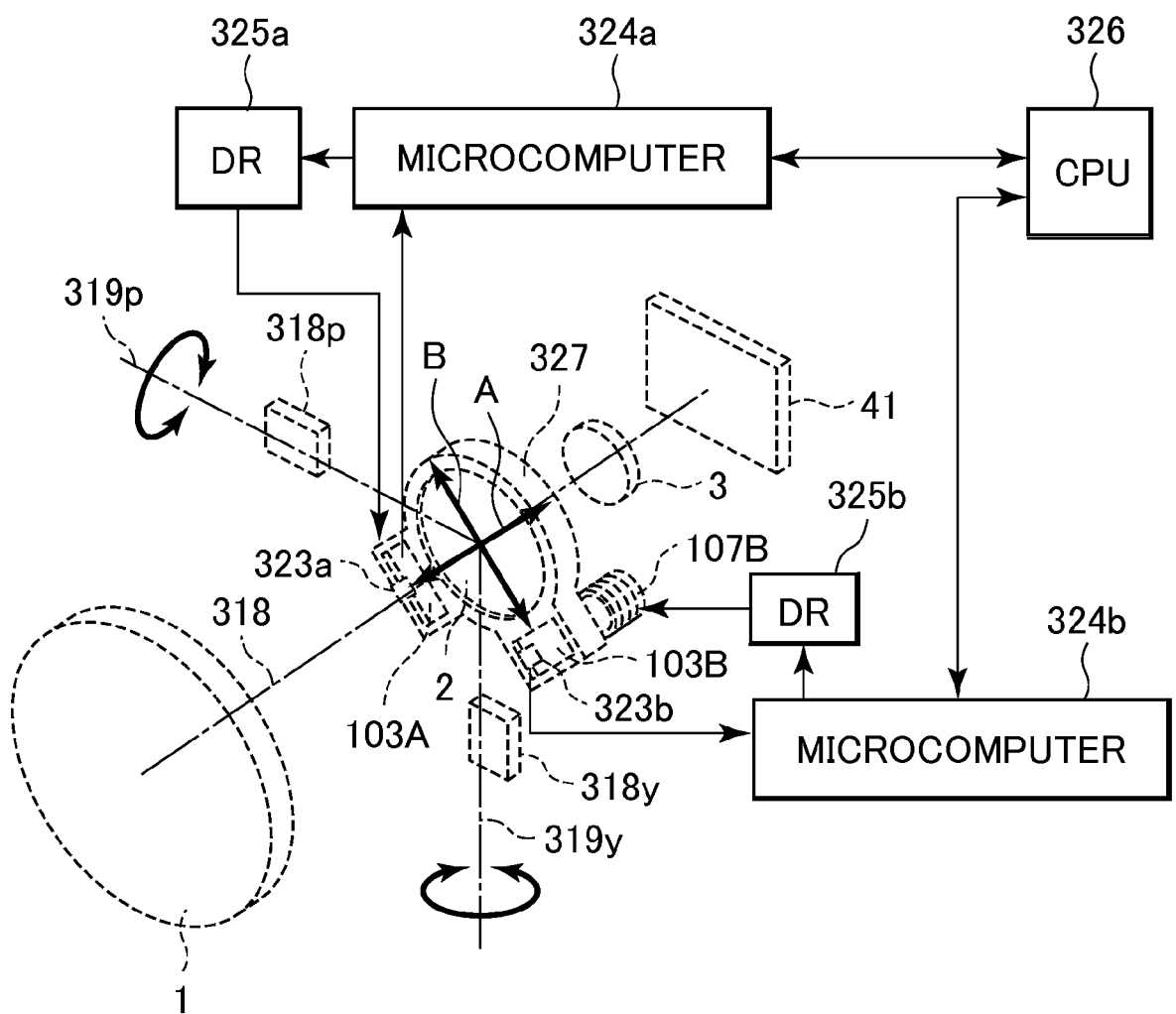
FIG. 2 is a schematic diagram of an image stabilization mechanism in the digital camera in FIG. 1.

FIG. 2 is a schematic diagram of an image stabilization mechanism in the digital camera in FIG. 1.

As shown in FIG. 2, the shooting lens includes a first lens group 1, which is a front lens group, a second lens group 2, which is an intermediate lens group, and a third lens group 3, which is a rear lens group, and forms an image of a subject on a CCD 41, which is a rectangular image sensor. The image stabilization mechanism stabilizes an image by moving the second lens group 2 in a plane perpendicular to an optical axis 318 to move the image of the subject on the CCD 41.

In the present embodiment, the image stabilization mechanism can move the second lens group 2 in two axis directions inclined at an angle of ±45 degrees to the direction of the short side of the CCD 41. These directions are referred to as "direction A" and "direction B". Sensors 318$p$ and 318$y$ detect movement around an axis (pitching axis) 319$p$ in the direction of the long side of the CCD 41 and movement around an axis (yawing axis) 319$y$ in the direction of the short side of the CCD 41, respectively.

The sensors 318$p$ and 318$y$ in the present embodiment are gyro devices that detect rotational angular accelerations. Although the directions of image stabilization by the second lens group are the directions A and B as described above, the gyro devices are rectangular parallelepiped packages, and thus, when they are mounted on a camera substrate, the sides of the rectangular parallelepipeds are arranged so that their respective directions correspond to the optical axis direction and the directions of the long and short sides of the CCD for good mount efficiency.

While in the present embodiment, the image-stabilizing directions are inclined at an angle of ±45 degrees to the short sides of the CCD 41 as described above, the image-stabilizing directions may be the directions of the short side and the long side of the CCD.

The former has an advantage in the effect of the gravity of the second lens group is evenly imposed on the two axes, suppressing occurrence of a large difference in control properties between the axes.

The second lens group 2 is held by a second lens group holder 102 and moves integrally with it. A movement mechanism that moves the second lens group 2 in the direction A includes a magnet 103A that is integrally held by the second lens group holder 102 and a coil (not shown) arranged facing the magnet 103A. Also, a movement mechanism that moves the second lens group 2 in the direction B includes a magnet 103B that is integrally held by the second lens group holder 102, and a coil 107B arranged facing the magnet 103B.

Magnetic fields of the magnets 103A and 103B are detected by Hall effect devices 323$a$ and 323$b$ and signals corresponding to the detected magnetic fields are input to microcomputers 324$a$ and 324$b$, respectively. The microcomputers 324$a$ and 324$b$, based on an instruction from a CPU 326, control outputs of drivers 325$a$ and 325$b$ so as to stabilize an image using outputs of the Hall effect devices 323$a$ and 323$b$ as feed back signals and supply power to the coils.

Image-stabilizing control for a camera having the above-described configuration will be described.

Upon the camera being powered on, the CPU 326 starts up, and makes the microcomputers 324$a$ and 324$b$ operate and detects outputs of the sensors 318$p$ and 318$y$. The CPU 326 combines components of movements around the axis 319$p$ in the direction of the long sides and the axis 319$y$ in the direction of the short sides, which are output from the sensors 318$p$ and 318$y$, converts them into components of movements around the axis in the direction A and the axis in the direction B, and input them to the microcomputers 324$a$ and 324$b$, respectively.

The microcomputers 324$a$ and 324$b$ detect output signals from the Hall effect devices 323$a$ and 323$b$, calculate the position of the second lens group holder 102, calculate the direction of movement to cancel out the movement components input from the CPU 326, and instruct the drivers 325$a$ and 325$b$ to apply current. The drivers 325$a$ and 325$b$ apply current to the respective coils (one is not shown while the other is shown as 107B) to make the coils generate magnetic fields to make the magnets 103A and 103B have electromagnetic forces in the direction of the axis in the direction A or B, thereby moving the second lens group holder 102.

The aforementioned microcomputers, coils and Hall effect devices form a feedback system, which repeats current application to the coils while calculating the position of the image-stabilizing lens holder with a fixed period after application of current to the coils to coils to stabilize an image.

As a result of the aforementioned operation being performed for the direction A and the direction B concurrently, the second lens group 2 can be moved in any direction in the plane perpendicular to the optical axis.

First Embodiment

Figure 3:
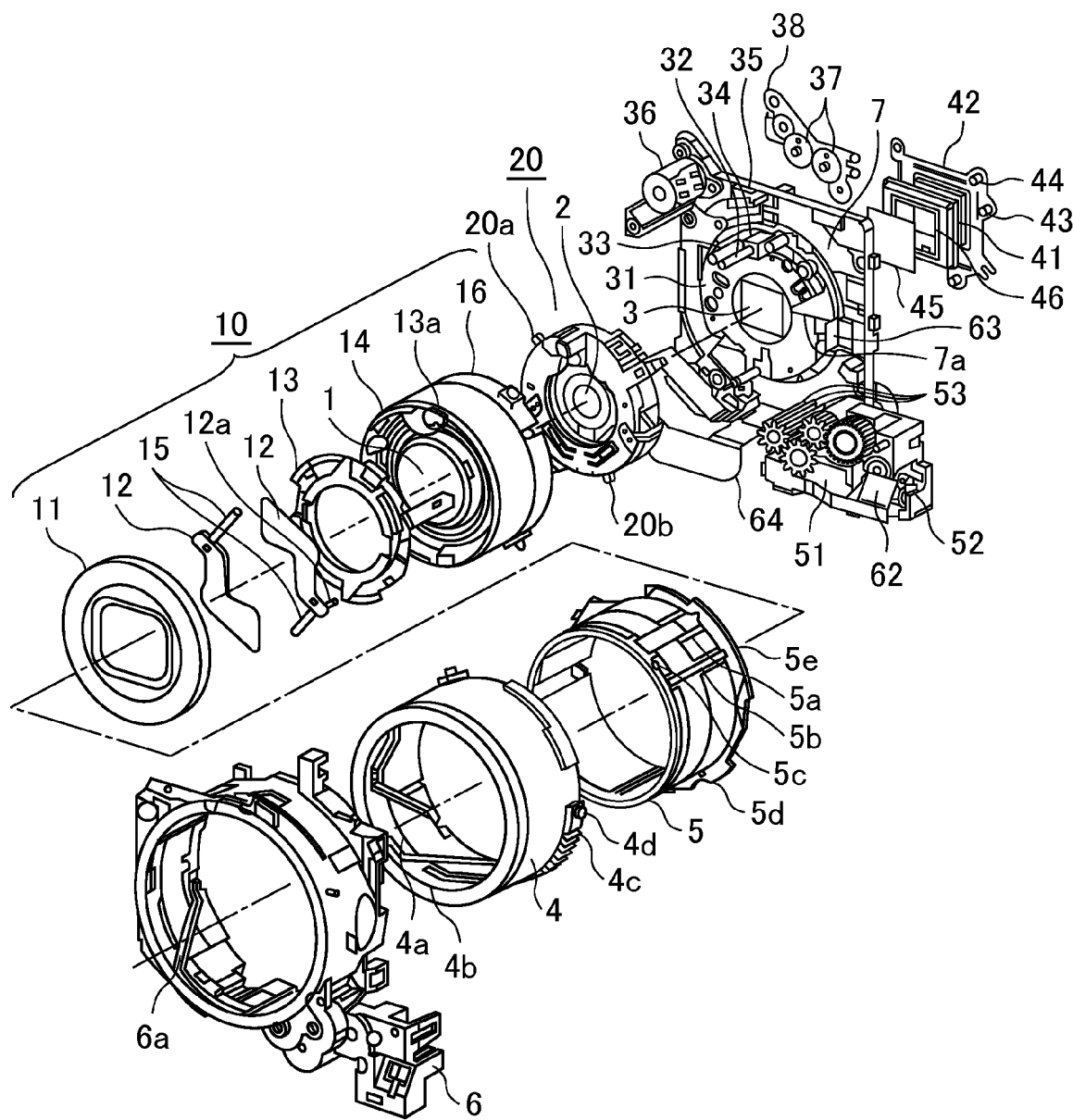
FIG. 3 is an exploded perspective view of a lens barrel (optical lens barrel) according to a first embodiment of the present invention.

FIG. 3 is an exploded perspective view of a lens barrel (optical lens barrel) according to a first embodiment of the present invention.

As shown in FIG. 3, the lens barrel includes a first barrel 10 that holds a first lens group 1, which is a front barrel, a second barrel 20 that holds a second lens group 2, which is an intermediate barrel, and a third barrel 31 that holds a third lens group 3, which is a rear barrel. In the optical system in the present embodiment, the first lens group 1 and the second lens group 2 are variable power lenses each having a field correcting effect, and the third lens group 3 is a focusing lens.

The front surface of a first lens group holder 14 that holds the first lens group 1 is covered by a decorative plate 11. Between the first lens group holder 14 and the decorative plate 11, a pair of lens barriers 12 that open/close by moving between the position to cover a shooting optical path and the position to retract, and a drive ring 13 that drives the lens barriers 12 are arranged. Each lens barrier 12 turns around a pivot shaft 12a that extends from an end of the lens barrier in the optical axis direction.

Figure 10:
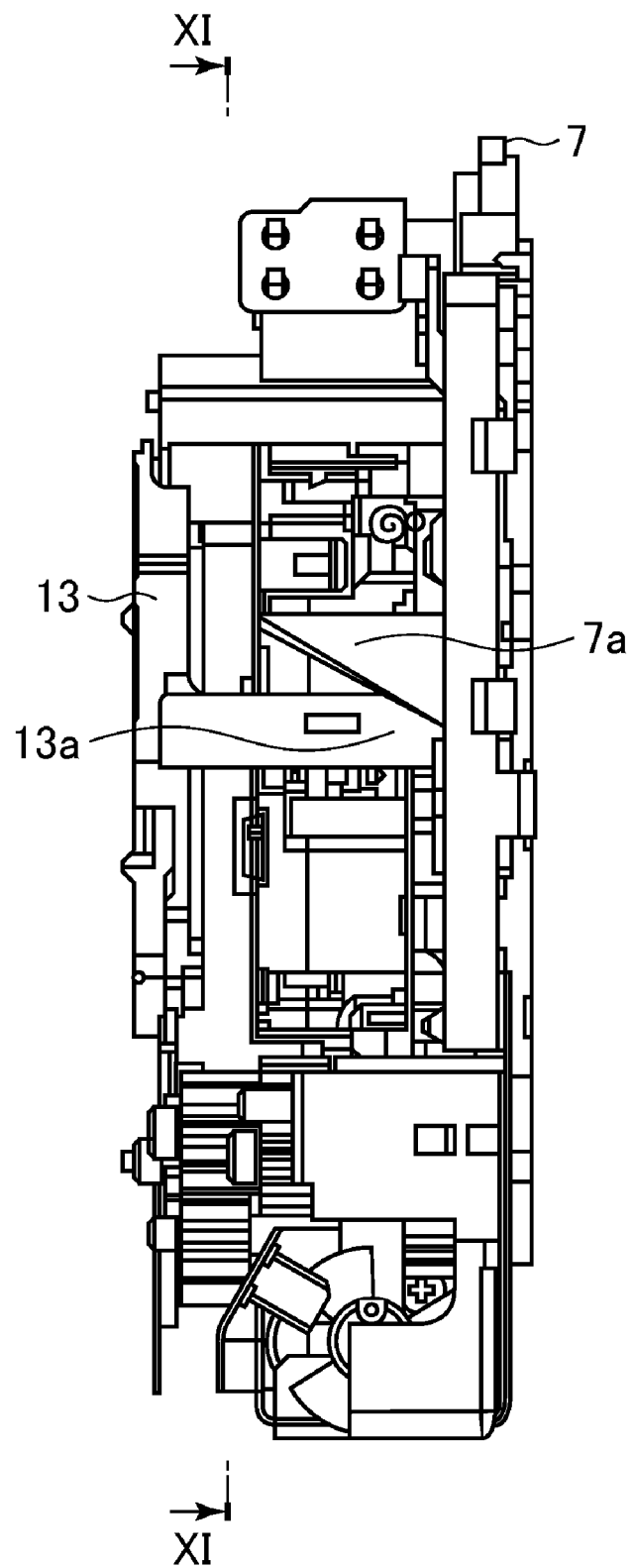
FIG. 10 is a side view of the lens barrel in FIG. 3 in the collapsed state, from which a decorative plate and lens barriers have been removed.

On the drive ring 13, an arm 13a is formed integrally with it, extending in the optical axis direction. The drive ring 13, which is a barrier actuating member, turns around the optical axis as a result of the arm 13a coming into contact with a drive cam 7a of a CCD holder, which will be described later. Engagement between the arm 13a of the drive ring 13 and the drive cam 7a is shown in FIG. 10.

A barrier spring 15 is put between each lens barrier 12 and the drive ring 13, and urges the lens barrier 12 in the closing direction. The first lens group holder 14 is provided with a follower pin 16 that fits in a cam slot 4a of a movable cam ring 4. The unit from the decorative panel 11 to the first lens group holder 14 forms the first barrel 10.

The second barrel 20 that holds the second lens group 2 includes a shutter unit, which will be described later, a diaphragm unit and an image stabilization mechanism, which is described above, in its inside. One side of the outer periphery of the second barrel 20 is provided with a fixed follower pin 20a integrated with the second barrel 20, and the other side is provided with a movable follower pin 20b, which is pressed by a spring (not shown) in a direction to move away from the optical axis. The movable follower pin 20b can move relative to the second barrel 20. The detailed configuration of the second barrel 20 will be described later.

The third lens group 3 is held by the third barrel 31. The third barrel 31 is held by a guide bar 32, one end of which is fixed to the CCD holder 7, in such a manner that it can slide in the optical axis direction. The third barrel 31 slides in the optical axis direction by means of a feed screw 33. A gear (not shown) is fixed to the rear end portion of the feed screw 33.

The third barrel 31 is made to lean to a feed nut 34, in which the feed screw 33 is screwed, by means of a tension spring 35. Also, turning of the feed nut 34 is restricted by the third barrel 31, and upon turning the feed screw 33, the feed nut 34 moves in the optical axis direction together with the third barrel 31. Rotation of a focus motor 36, which is a drive source that drives the third barrel 31, is transmitted to the feed screw 33 via a transmission gear 37. The transmission gear 37 is held by a gear cover 38.

The aforementioned barrier drive cam 7a is formed integrally with the CCD holder 7. A CCD 41 as an image sensor that converts an image formed by an optical system to electrical signals is held by a CCD plate 42. The CCD plate 42 is attached to the CCD holder 7 via a CCD adjustment screw 44. A CCD spring 43 is attached to the CCD plate 42 and urges the CCD plate 42 in a direction to be spaced away from the CCD holder 7. The position of the CCD plate 42 in the optical axis direction can be adjusted by adjusting the CCD adjustment screw 44.

A low-pass filter 45 is attached to the front surface of the CCD 41, and between the low-pass filter 45 and the CCD plate 42, a dust prevention rubber 46, which occludes the space between them to prevent dust from entering the space between the CCD 41 and the low-pass filter 45, is provided.

A zoom motor 51, which is a drive source for a zoom drive system that drives the first barrel 10 and the second barrel 20 in the optical axis direction, is attached to the CCD holder 7. Rotation of a worm gear 52 directly connected to the rotation shaft of the zoom motor 51 is sequentially transmitted by a zoom gear train 53.

On the inter peripheral surface of the movable cam ring 4 that moves the first barrel and the second barrel, the cam slot 4a in which the follower pin 16 of the first barrel 10 fits and a cam slot 4b in which the fixed follower pin 20a of the second barrel 20 fits are formed. On the outer periphery of the rear end portion of the movable cam ring 4, a gear 4c, which engages with the zoom gear train 53 is formed. Also, on the outer periphery of the rear end portion, a follower pin 4d, which fits in a cam slot 6a of a fixed barrel 6, which will be described layer, is provided integrally with the cam ring.

On the side surface of a linear movement guide ring 5, which restricts the turning of the first barrel 10 and the second barrel 20, a guide slot 5a that linearly guides the first barrel 10 and a guide slot 5b that linearly guides the second barrel 20 are provided.

Also, on the outer periphery of the front end portion of the linear movement guide ring 5, a projection 5c is formed, and at the rear end portion, a flange section 5d is formed. These projection 5c and flange section 5d form a structure to prevent the linear movement guide ring 5 from coming off from the movable cam ring 4. A projection 5e is formed on the flange section 5d, and the projection 5e fits in a linear-movement slot (not shown) provided on the inner surface of the fixed barrel 6, which will be described later, and thus, the linear movement guide ring 5 is movable only in the optical axis direction. On the inner peripheral surface of the fixed barrel 6 that holds the movable cam ring 4 as described above, a cam slot 6a is formed.

A zoom motor 51 and a focus motor 36 of the lens barrel are supplied with power by a flexible printed circuit board (hereinafter, referred to as "barrel FPC") 64. A photointerrupter 62 is provided on the rear surface side of the barrel FPC 64 in FIG. 3. The photointerrupter 62 detects rotation of a propeller formed integrally with a worm gear 52 in cooperation with another photointerrupter (not shown).

An operation of a lens barrel configured as described above will be described. First, a zooming operation will be described.

Upon rotation of the zoom motor 51, the worm gear 52 and the zoom gear train 53 are rotated, and a driving force is transmitted to the gear 4c of the movable cam ring 4 that engages with the gear train 53, thereby the movable cam ring 4 turning. Upon turning of the movable cam ring 4, the movable cam ring 4 moves in the optical axis direction while turning since the follower 4d follows the cam slot 6a of the fixed barrel 6.

The first barrel 10 and the second barrel 20 arranged inside the movable cam ring 4 have their respective follower pins 16 and 20a be engaged with the cam slots 4a and 4b. Since these pins also engage with the guide slots 5a and 5b of the linear movement guide ring 5, turning of which is restricted by the fixed barrel 6, turning of the first barrel 10 and the second barrel 20 is restricted. Thus, the first barrel 10 and the second barrel 20 moves in the optical axis direction without turning. Upon stopping the zoom motor 51 at a desired position, the zoom magnification is determined according to the positions of the first lens group and the second lens group.

Here, for detection of the zoom position, a reset position of the linear movement guide ring 5 in the optical axis direction is detected by the photointerrupter (not shown) as a reference position, and the turning direction and turning pulse are detected by the photointerrupter 62 and the other photointerrupter (not shown). Then, a position relative to the reference position is calculated.

Next, a focusing operation will be described.

Upon rotation of the focus motor 36, rotation of a pinion gear (not shown) is transmitted to a gear of the feed screw 33 by means of the transmission gear 37, thereby rotating the feed screw 33. Rotation direction of the nut 34 in which the feed screw 33 is screwed is restricted by the third barrel 31.

Thus, upon rotation of the feed screw 33, the nut 34 cannot rotate and can move only in the feed screw axis direction, and the third barrel 31 leaning to the nut 34 also moves in the optical axis direction integrally with the nut 34.

The reference position of the third barrel 31 is detected by a photointerrupter 63 mounted on the rear surface side of the barrel FPC 64 in the figure. Since the present embodiment employs a pulse motor as the focus motor 36, the position of the third barrel 31 can be calculated by counting the driving pulses of the focus motor 36 with the reference position as the origin.

Figure 4:
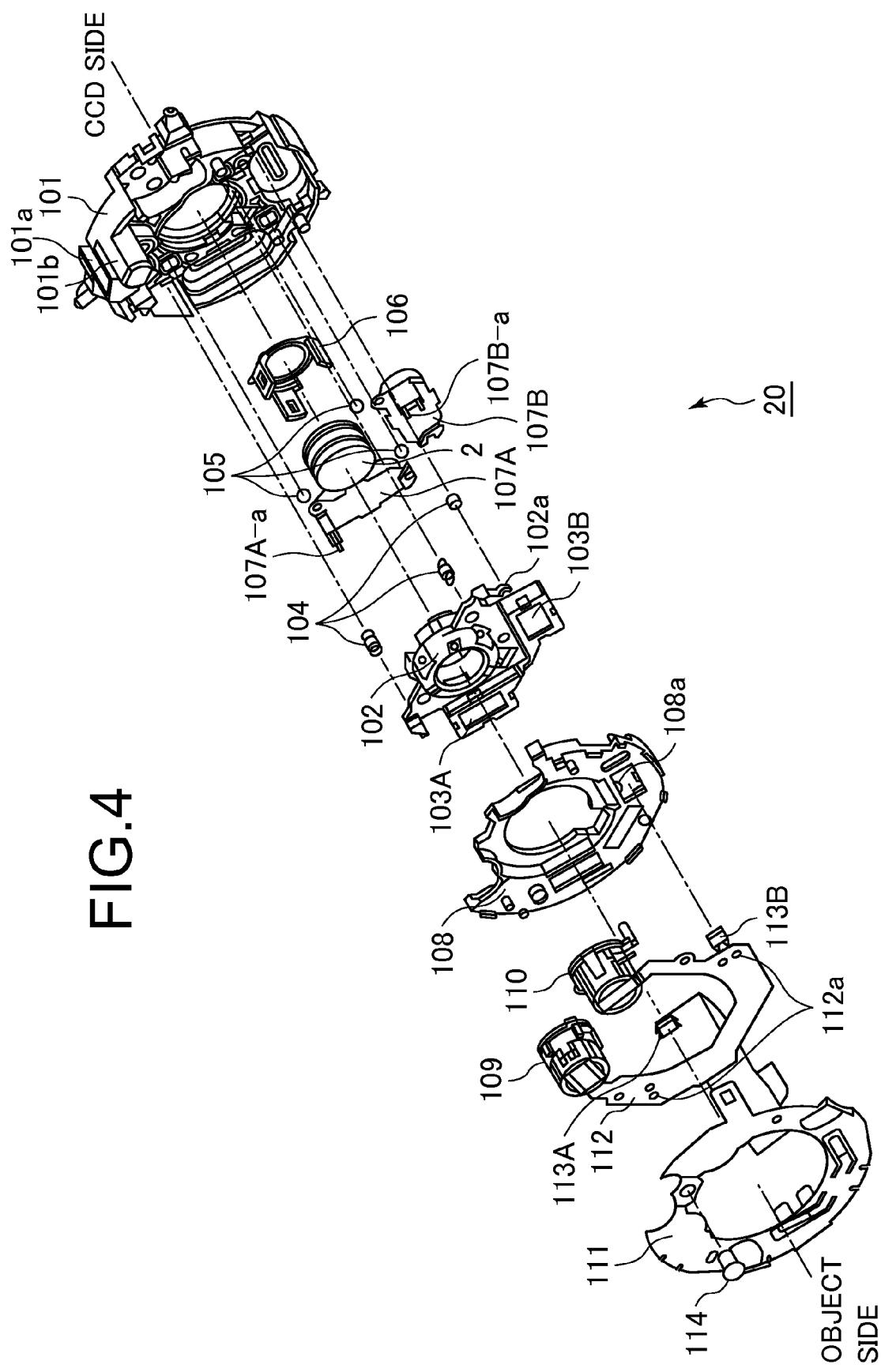
FIG. 4 is an exploded perspective view of the second barrel in the lens barrel shown in FIG. 3, which shows a configuration on the object side of a second lens group base, which is a base for the second barrel.

Next, the configuration of the second barrel as the intermediate barrel will be described with reference to FIGS. 4, 5 and 6.

The second barrel 20 includes the image stabilization, shutter and diaphragm mechanisms as described above. FIG. 4 is an exploded perspective view of the second barrel 20, which shows the configuration on the object side of a second lens group base 101, which is the base for the second barrel 20. In FIG. 4, at the outer peripheral portion of the second lens group base 101, a clearance section 101a for the aforementioned focus feed screw 33 and a clearance section 101b for the focus guide bar 32 are formed. Hereinafter, these clearance sections for the third lens group feed mechanisms are referred to as "third lens group clearance sections".

While the present lens barrel becomes compact by reducing the distances between the respective barrels during the lens barrel being not used (housed) (hereinafter, this state is referred to as "collapsed state"), the focus feed screw 33 and the focus guide bar 32 project in the optical axis direction, and thus extends through the second lens group base 101 during the lens barrel being collapsed.

Therefore, in order to prevent a light beam not passing through the lenses from passing through the portions through which the focus feed screw 33 and the focus guide bar 32 extend and entering the CCD 41, each of the third lens group clearance sections 101a and 101 is formed in a sack-like shape, which prevents leakage of light beams as much as possible.

The second lens group 2 is held by being swaged to the second lens group holder 102. The second lens group holder 102 holds the magnets 103A and 103B integrally with it. Subscripts A and B in the reference numerals in FIG. 4 correspond to the directions A and B in FIG. 2.

At the second lens group holder 102, three hooks 102a are formed, and a fixed diaphragm 106, which blocks ineffective light, is fixed to the second lens group holder 102 via these hooks. One end of a tension spring 104 is put on each of the three hooks 102a. The other end of the tension spring 104 is put on each of hooks (not shown) of the second lens group base 101, and the second lens group holder 102 is urged toward the second lens group base 101 with three nonmagnetic balls 105 provided therebetween.

However, because of the interposition of the balls 105, the second lens group holder 102 can freely move relative to the second lens group base 101 in a plane perpendicular to the optical axis. By means of moving the second lens group holder 102 in the plane perpendicular to the optical axis, an image on the CCD is controlled to be stabilized.

Coil units 107A and 107B, each including a coil and a bobbin, are bonded and fixed to dents in the second lens group base 101. A second lens group FPC (flexible printed circuit board) 112, which will be described later, is connected to metal pins 107A-a and 107B-a embedded in the bobbins and electrically connected to the coils, thereby enabling power supply to the coils.

An actuator 109 that drives shutter fins and an actuator 110 that drives an ND filter are soldered to the opposite ends of the second lens group FPC 112 having a half-arc shape. The actuators 109 and 110 are both what are called two point-switching type actuators, in which the arm stop position is switched from one to the other depending on normal/reverse turning according to the direction of current application.

The intermediate portion of the second lens group FPC 112 is provided with lands 112a soldered to the metal pins 107A-a and 107B-a. Also, Hall effect devices 113A and 113B that detect magnetic fields are connected to the rear surface side of the second lens group FPC 112.

In other words, the actuator 109 as a drive source for the shutter unit is connected to one end of the second lens group FPC 112 as a power supply member that supplies power to the shutter unit and the light amount control unit, and the actuator 110 as a drive source for the light amount control unit is connected to the other end of the power supply member.

Figure 6:
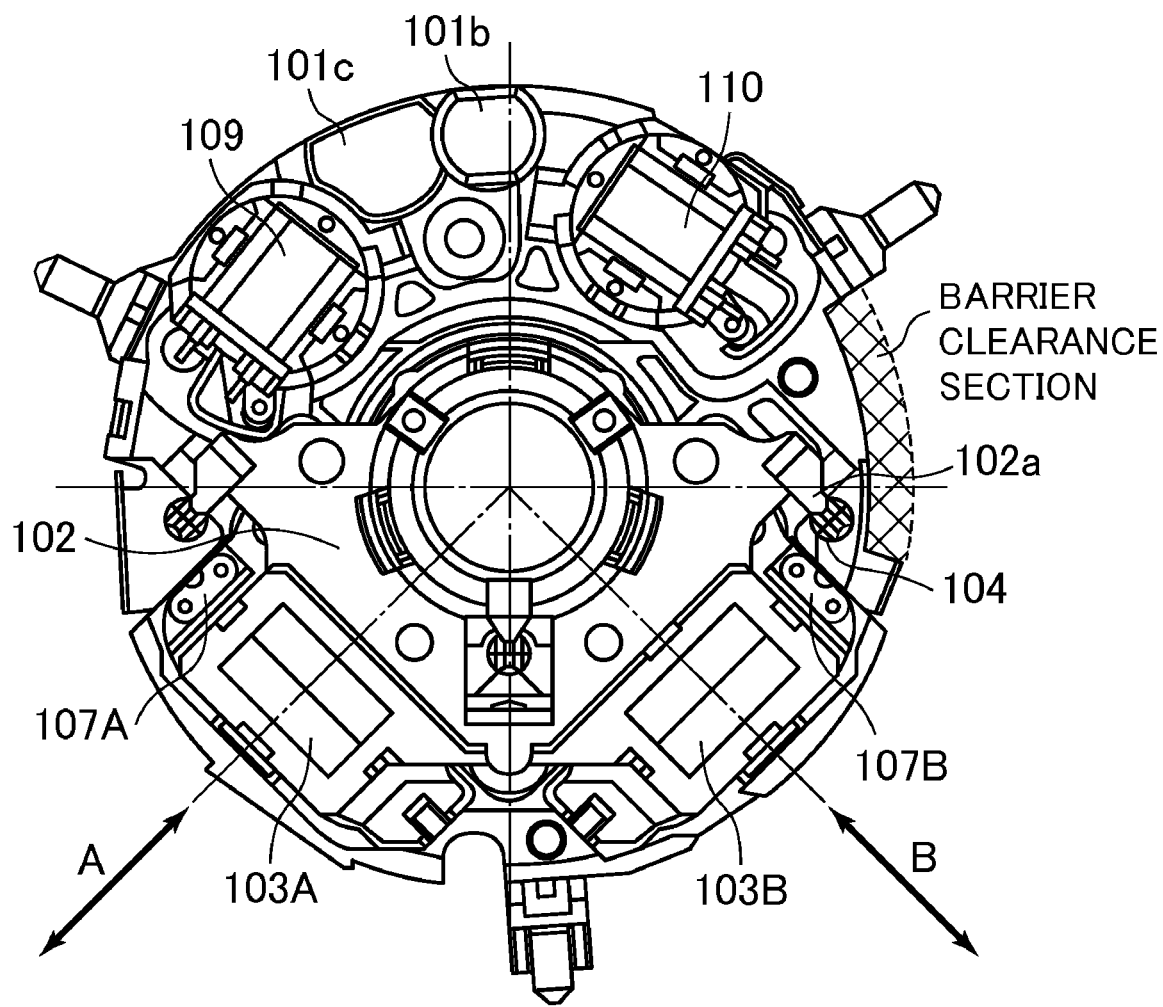
FIG. 6 is a front view of the second barrel in the lens barrel shown in FIG. 3, which shows a state in which a second lens group cover, a second lens group FPC and a sensor holder have been removed.

FIG. 6 is a front view of the second barrel 20, which shows a state in which a cover 111, the second lens group FPC 112 and a sensor holder 108 have been removed. The magnets 103A and 103B of the second lens group holder 102, as shown in FIG. 6, are magnetized in the directions A and B. The respective Hall effect devices detect movements of the magnets 103A and 103B in the directions A and B as magnetic field variations. The amounts of movements are calculated based on the amounts of the variations. Since the positional accuracy for the magnets and the Hall effect devices is important, the Hall effect devices 113A and 113B are pressed into the sensor holder 108 and positioned with high accuracy.

The second lens group FPC 112 as described above is fixed onto the sensor holder 108, and the sensor holder 108 is mounted on the second lens group base 101. Then, the second lens group cover 111 is fixed to the second lens group base 101 via a screw 114 and an outer peripheral hook, thereby the sensor holder 108 and the actuators 109 and 110 being secured to the second lens group base 101.

A barrier clearance section for avoiding interference with the arm 13a of the drive ring 13, which is a barrier actuating member, and the barrier drive cam 7a, as indicated by the hatching in FIG. 6, is provided in a position adjacent to the drive source (actuator 110) for the light amount control unit.

Figure 5:
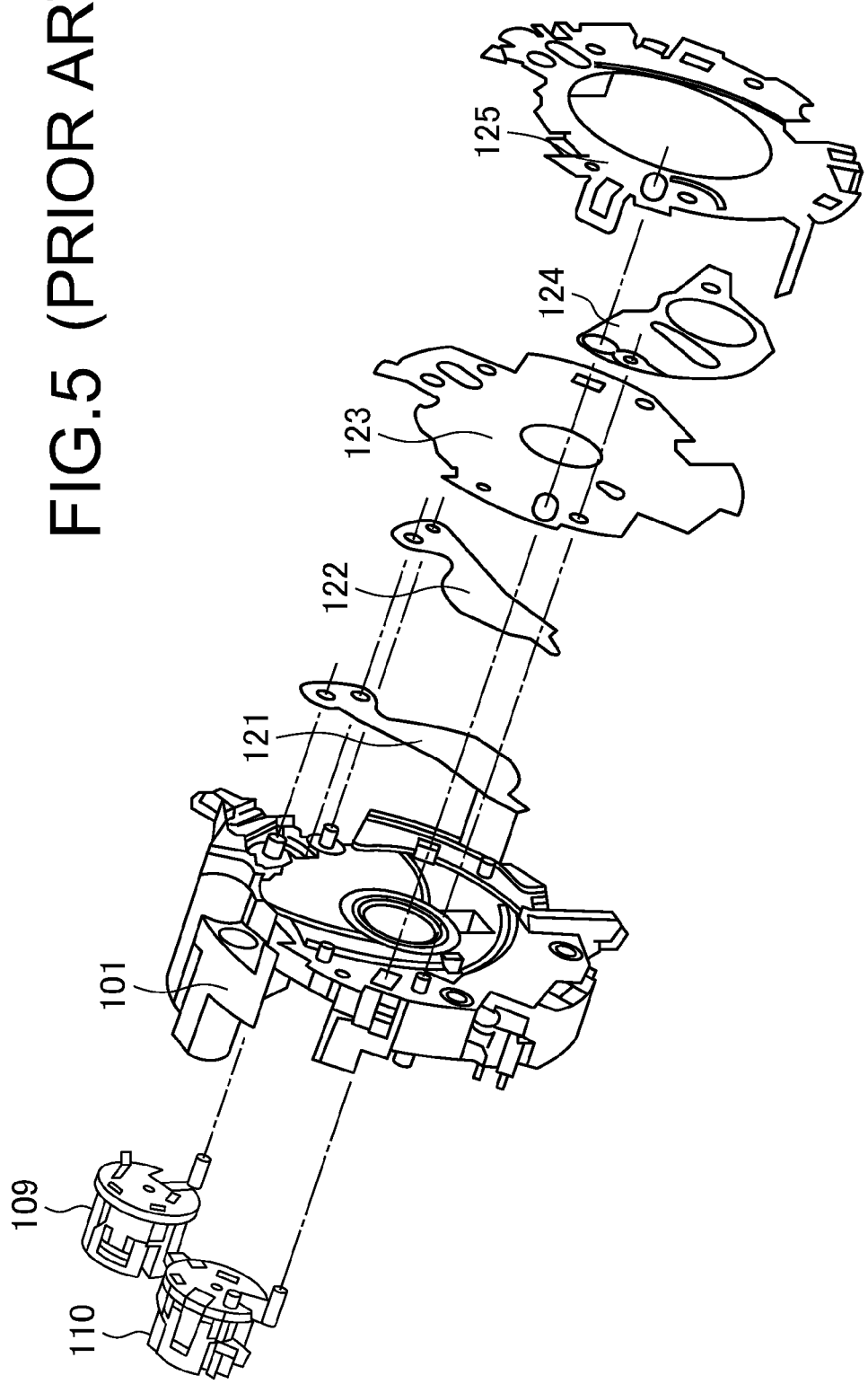
FIG. 5 is an exploded perspective view of the second barrel in the lens barrel shown in FIG. 3, which shows a configuration on the CCD side of a second lens group base, which is a base for the second barrel.

FIG. 5 is an exploded perspective view of the second barrel 20, which shows the configuration on the CCD side of the second lens group base 101.

The shutter fins 121 and 122 are driven by a drive arm of the actuator (shutter actuator) 19. An ND filter 124 that limits a light amount is arranged on the CCD side of the shutter fin 122 via a partition plate 123. The ND filter 124 is driven by the actuator 110. The actuator 110 switches the position of the ND filter 124 between an entering position on the optical path and a retracted position out of the optical path. A shutter cover 125 is fixed to the second lens group base 101 via a hook, and protects the shutter fins 121 and 122 and the ND filter 124.

Next, an operation of the lens barriers will be described with reference to FIGS. 7 to 9.

Figure 7:
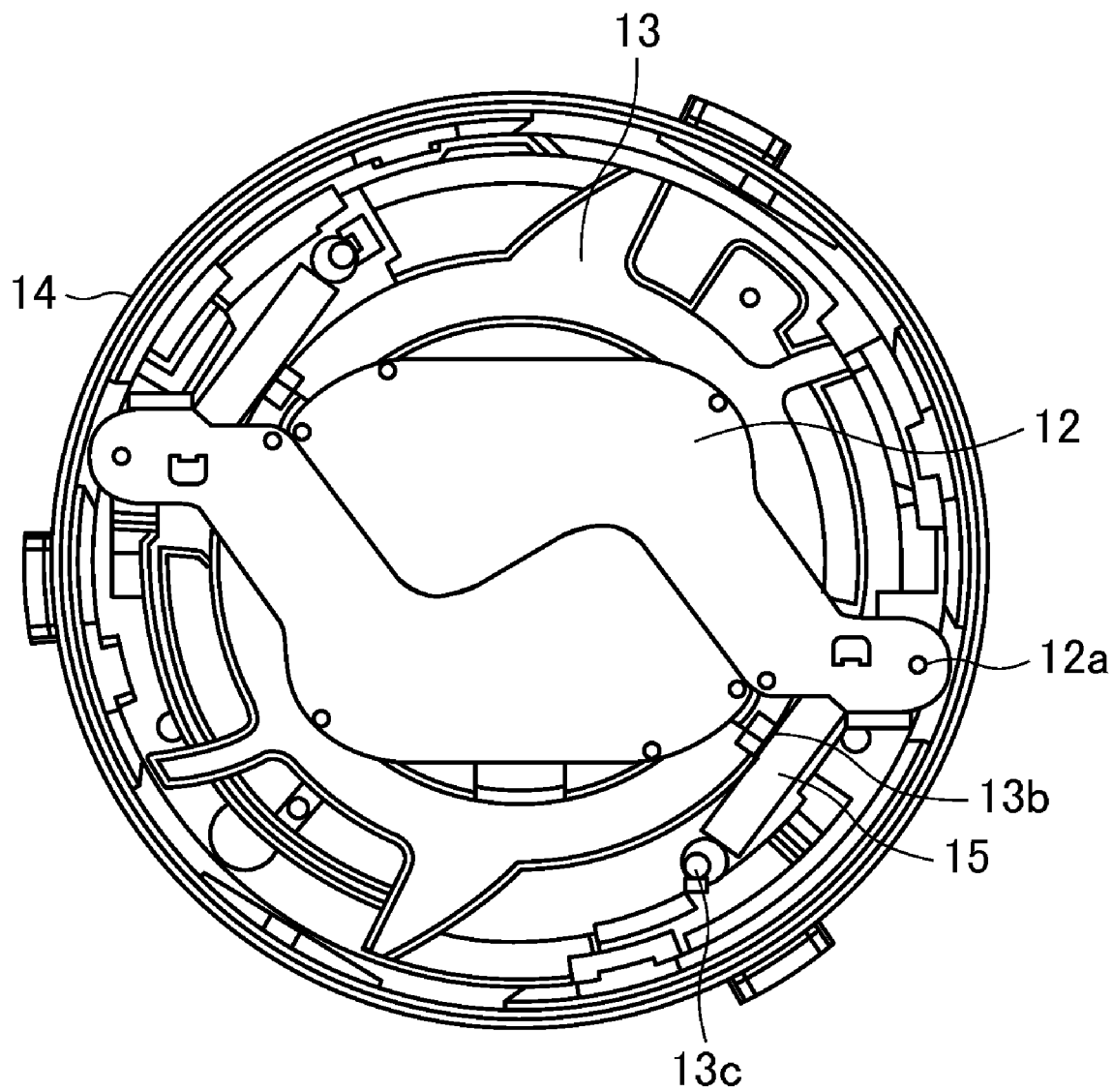
FIG. 7 is a front view of the lens barrel shown in FIG. 3 with a decorative plate removed, viewed from the object side, which shows a state in which the lens barrel has contracted during being housed (collapsed state).
Figure 8:
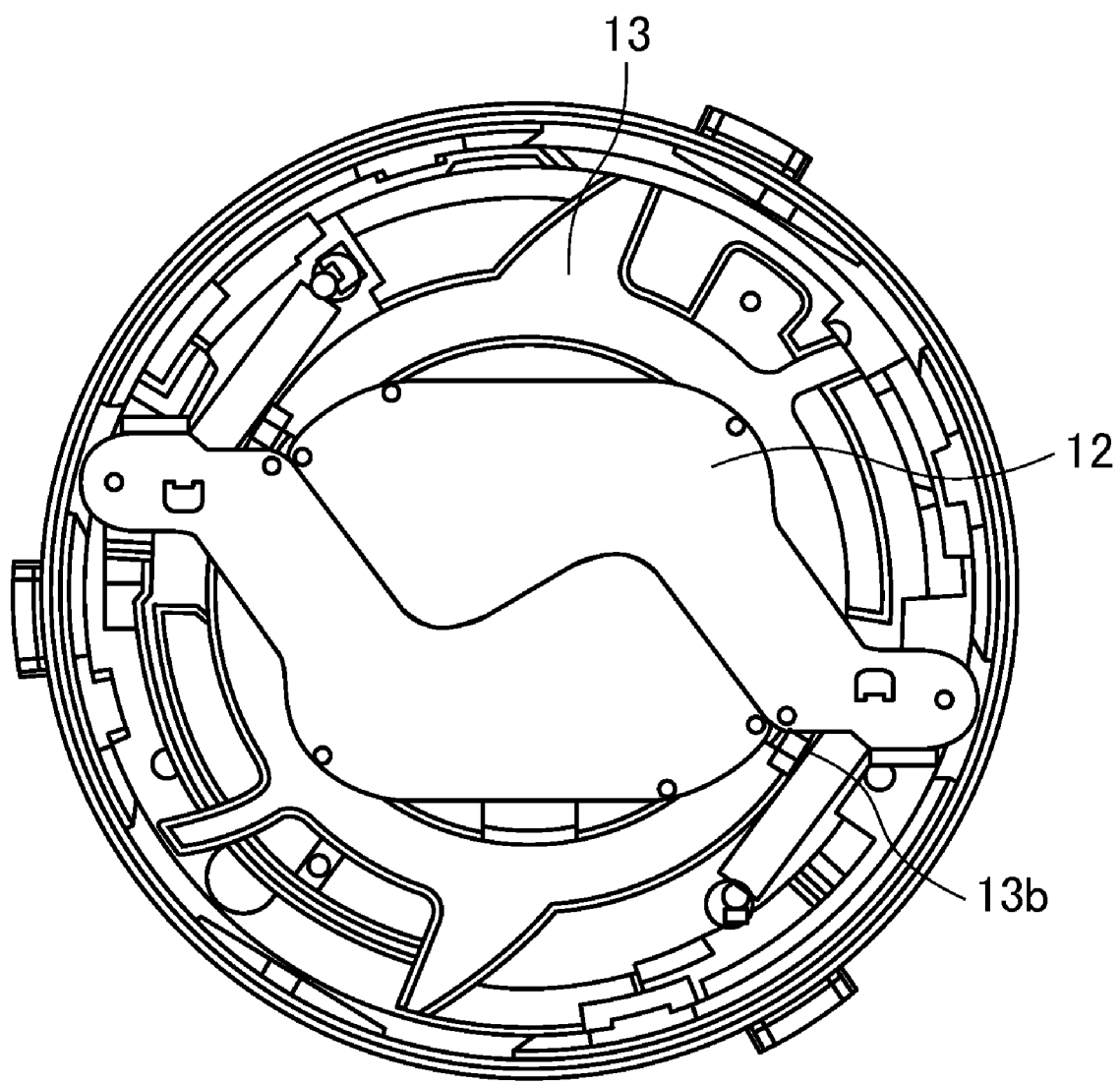
FIG. 8 is a front view of the lens barrel shown in FIG. 3 with a decorative plate removed, viewed from the object side, which shows a state in which lens barriers start opening.
Figure 9:
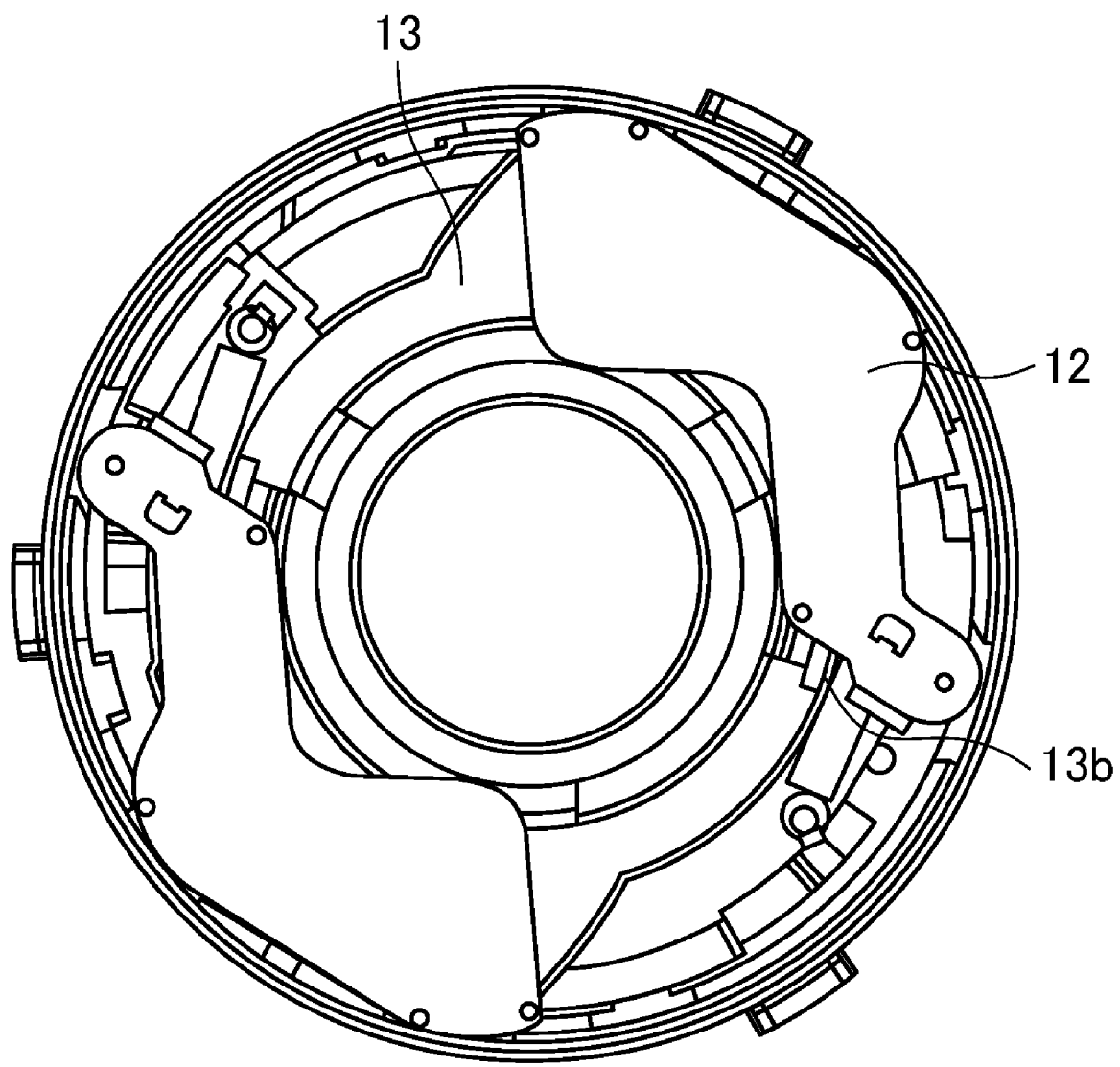
FIG. 9 is a front view of the lens barrel shown in FIG. 3 with a decorative plate removed, viewed from the object side, which shows a state in which lens barriers are fully open (stretched state).

FIGS. 7 to 9 are front views of the lens barrel according to the present embodiment, with the decorative panel 11 removed, viewed from the object side. FIG. 7 shows a state in which the lens barrel is contracted during the camera being not used (collapsed state), FIG. 8 shows a state in which the lens barriers start opening, and FIG. 9 shows a state in which the lens barrel can be used for shooting and the lens barrier is fully open (stretched state).

As described with reference to FIG. 3, the arm 13a of the drive ring 13 abuts on the drive cam 7a of the CCD holder 7 and the drive ring 13 is thereby driven to turn along the slope of the drive cam 7a. With reference to FIGS. 7 to 9, when the lens barrel is changed from the stretched state to the collapsed state, the drive ring turns clockwise, and when changed from the collapsed state to the stretched state, the drive ring turns counterclockwise.

The pivot shaft 12a of each lens barrier 12 pivotally fits in a shaft hole formed in the first lens group holder 14. The rear side of the lens barrier 12 is provided with a hook (not shown), which is locked with a hook of the barrier spring 15. A hook on the other end of each barrier spring 15 is locked with a hook 13c provided to the drive ring 13, thereby the lens barrier 12 being consistently pulled in the closing direction.

In FIG. 7, two barriers 12 abut on each other. The drive ring 13 is turned clockwise by means of the drive cam 7a and stopped. At this time, the barrier springs 15 are in a state in which they are maximally charged.

FIG. 8 shows a state in which the lens barrel is stretched slightly, and the drive ring 13 turns counterclockwise along the drive cam 7a. In the drive ring 13, two actuating sections 13b that abut on the lens barriers 12 are formed.

FIG. 9 shows a state in which the lens barrel is fully stretched: the arm 13a of the drive ring 13 is away from the drive cam 7a. The drive ring 13 further turns counterclockwise for the actuating sections 13b to press the lens barriers 12, and the respective lens barriers 12 turn around the pivots 12a clockwise to enter an open state.

Here, for turning of the lens barriers 12 by means of the drive ring 13, the leverage ratio between a force from the drive ring 13 and a force from the barrier springs 15, which are applied to the fins, is used.

In other words, since the distance from each pivot shaft center to each spring hook is larger than the distance from the pivot shaft center to each actuating point, even though forces applied from the spring hook and the actuating section are substantially equal to each other, the force from the actuating section has a larger moment to turn the fin, and as a result, the lens barrier is pressed to open.

The mechanism for opening/closing the barriers is not limited to the above-described configuration, and a description similar to the above can apply to any system to open/close the barriers via the drive ring 13.

Next, an arrangement in which the above-described second lens group unit and barrier drive mechanism can work with the size kept compact will be described.

Figure 11:
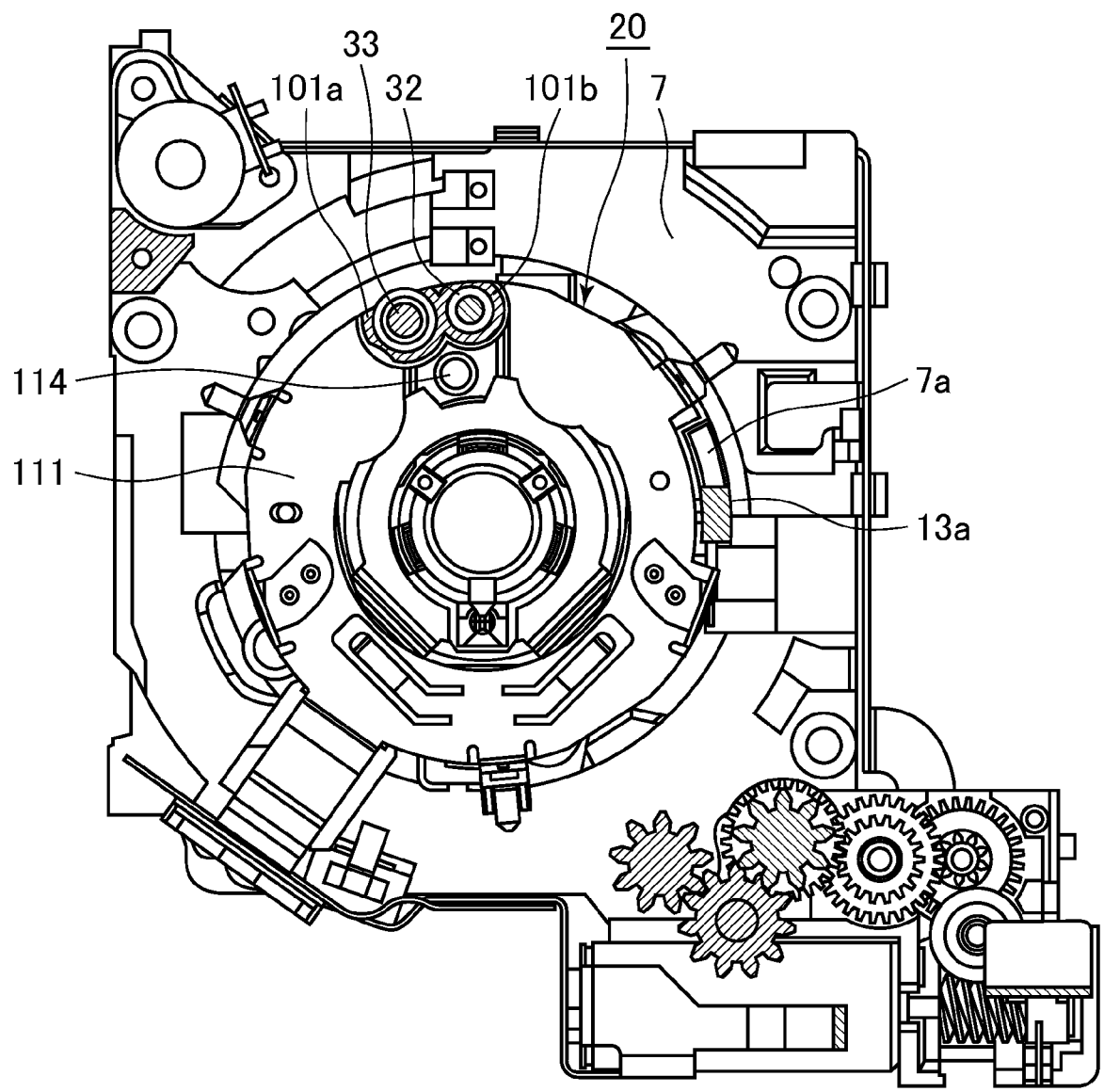
FIG. 11 is a cross-sectional view taken along line XI-XI of FIG. 10.

FIG. 10 is a side view of the lens barrel during being collapsed with the decorative panel 11 and the lens barrier 12 removed, and FIG. 11 is a cross-sectional view along line XI-XI of FIG. 10.

As shown in FIG. 10, the second barrel 20, during being collapsed, approaches the CCD holder 7 until it substantially reaches the drive cam 7a, and the entire length of the lens barrel is shorted. Here, the drive cam 7a and the arm 13a, as shown in FIG. 11, are arranged at the peripheral portion on the right side of the second barrel 20, viewed from the object side.

Since the drive cam 7a extends in the optical axis direction, it easily receives a light beam outside the image taking area, i.e., what is called an ineffective light beam, and thus, reflected light enters the image sensor, which may cause a ghost image. Therefore, it is desirable to suppress occurrence of the aforementioned phenomenon in a general position of a camera, that is, a position in which the grip comes on the right viewed from the side of a user holding the camera (hereinafter, referred to as "normal position"), and for that purpose, it is desirable to arrange the drive cam 7a upper than the optical axis as much as possible.

This is because in the normal position, a source of light with a high luminance, such as the sun, is normally positioned upper than a subject in many cases, and therefore, arrangement of the drive cam at a position upper than the optical axis can suppress provision of ineffective light to the drive cam 7a.

Furthermore, in order to suppress provision of ineffective light, and to, even if ineffective light is provided, suppress entrance of the light to the image sensor (CCD 41), it is important to arrange the drive cam 7a as far away from the optical axis as possible. Accordingly, in the present embodiment, as shown in FIG. 11, the drive cam 7a is arranged at the outer peripheral portion of the second barrel 20. Also, the second barrel 20 has a region from which the drive cam 7a and the arm 13a extend (barrier clearance section), and no components can be placed in that region. However, in order to effectively use the region around that region, it is important to arrange the drive cam 7a at the outer peripheral portion as much as possible.

As described above, the desirable arrangement of the drive cam 7a is limited to a position upper than the optical axis and at the outer periphery of the second barrel 20 in the normal position.

For a similar reason, the positions of the guide bar 32 and the feed screw 33, which forms a feed mechanism for the third barrel 31, are also naturally determined to be at an outer peripheral portion upper than the optical axis. In particular, these two components are formed of metals because of their strengths, and thus, have high reflectance, and also, in general, their lengths are larger than the length of the drive cam 7a, which makes such components easily receive ineffective light. Therefore, in the present embodiment, they are positioned just above the optical axis in the normal position. The third lens group clearance sections are also formed at the same positions.

As described above, the positions of the third lens group clearance sections are also determined.

Furthermore, as shown in FIG. 6, the coils 107A and 107B and the magnets 103A and 103B, which drive the second lens group holder 102, are arranged in the portion below the optical axis. As described above, if the third lens group drive mechanism is arranged above the optical axis, the coils and magnets inclined relative to each other by 90 degrees need to be arranged below the optical axis as shown in FIG. 6.

The actuators 109 and 110 for the shutter and the diaphragm are arranged in the remaining region; however, the third lens group clearance sections are provided just above the optical axis, and below the optical axis, the image stabilization mechanism is provided, and accordingly, the region in which the actuators 109 and 110 can be arranged are limited to two positions between the third lens group clearance sections and the image stabilization mechanism.

Also, it is difficult to arrange two actuators 109 and 110 between the third lens group clearance sections and the coils, and thus, in the present embodiment, as shown in FIG. 6, the actuator 109 for the shutter is arranged to the upper left of the optical axis, and the actuator 110 for the ND filter 124 is arranged to the upper right of the optical axis.

As described above, it is desirable to arrange the drive cam 7a on the upper side of the optical axis and at the outer periphery of the second barrel 20. However, at the outer periphery on the upper side of the optical axis, as described above, the third lens group clearance sections are arranged, making it impossible to arrange the drive cam 7a in the same position as those of the third lens group clearance sections with the optical axis as the center.

Also, the actuators have sizes maximally using a limited space in order to obtain a high shutter speed, and thus, are arranged using up to the outer peripheral portion of the second barrel 20. Accordingly, the drive cam 7a and the arm 13a can also not be arranged at the same positions as the actuators.

The remaining positions are between the third lens group clearance sections (101a and 101b) and the actuators (109 and 110), or between the coils (107A and 107B) and the actuators (109 and 110).

For the former case, it is necessary to make the actuators be closer to the coils to widen the spaces between the third lens group clearance sections and the actuators. However, the second lens group holder 102 is arranged closer to the actuators relative to the coils, making it impossible to obtain sufficient spaces. For the latter case, it is necessary to make the actuators be closer to the third lens group clearance sections to widen the spaces between the actuators and the coils.

Here, the region required for actuating the drive cam 7a and the arm 13a (barrier clearance section) is a fan-like region 120 indicated by cross-hatching in FIG. 6. Thus, it can be positioned outside the hooks 102a of the second lens group holder 102, enabling an arrangement of the region further closer to the coils relative to the actuators.

As described above, a barrier clearance section can be arranged in the phase between the actuators and the coils. Also, the barrier drive cam 7a and the arm 13a can be arranged without enlarging the second barrel 20.

Next, the positional relationship between the second lens group FPC 112 and the actuators will be described with reference to FIG. 12.

Figure 12:
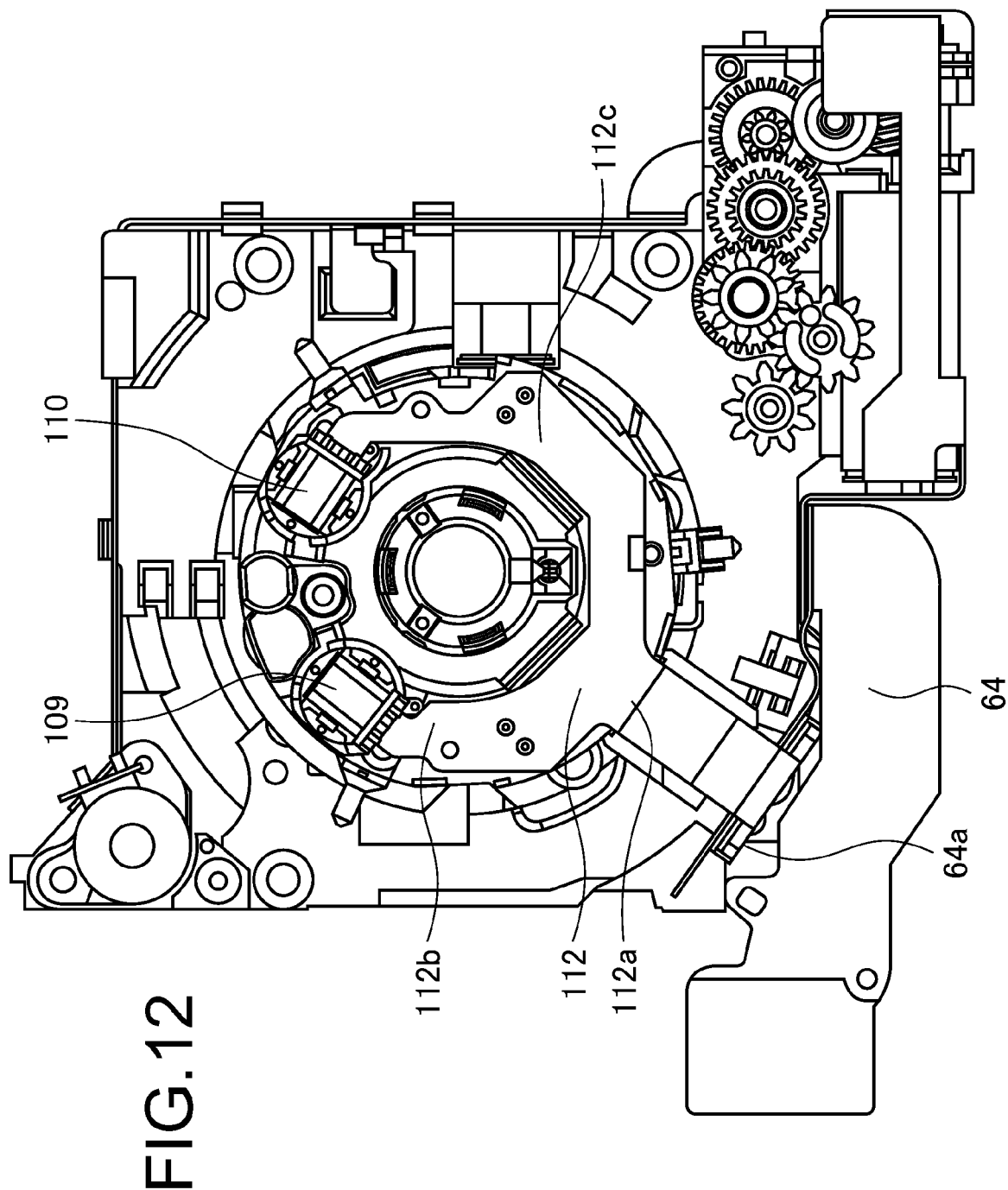
FIG. 12 is a front view of the lens barrel shown in FIG. 3, which shows a state in which a first barrel and a second lens group cover have been removed.

FIG. 12 shows a state in which the second lens group cover 111 has been removed from the lens barrel in FIG. 11 and the second lens group FPC 112 appears. Although the second lens group FPC 112 is connected to the lens barrel FPC 64 via a connector 64a outside the fixed barrel 6, it is not desirable that a connector hangs over the upper, lower, left or right side of the lens barrel because it affects the size of the camera.

Therefore, the second lens group FPC 112 is arranged in a diagonal direction of the lens barrel. However, an optical finder and a cam plate that drives the optical finder via a cam (not shown) are arranged at the outer periphery above the optical axis of the lens barrel. Thus, it is difficult to draw the second lens group FPC 112 to the outside of the fixed barrel 6 from the portion above the optical axis without interfering with these optical finder and cam plate. Therefore, as shown in FIG. 12, the second lens group FPC 112 is drawn out from the lower left portion below the optical axis in which the zoom drive system is not arranged.

In general, the shutter actuator 109 requires a relative large current to actuate the shutter at a high speed. The wiring of the FPC is formed of a thin copper foil, and thus, naturally tends to have a high electric resistance. In order to make a large current flow as described above, it is desired to reduce the length of the FPC wiring as much as possible.

Therefore, in the present embodiment, as shown in FIG. 12, the shutter actuator 109 is connected to a shorter arm 112b of the arc-like portion of the second lens group FPC 112.

Also, the region of the second lens group FPC 112 through which the drive cam 7a and the arm 13a extend is cut and thus, the second lens group FPC 112 is narrowed at that region. Then, although a wide wiring width cannot be secured, resulting in a high electric resistance, the longer arm 112c of the arc-like portion drives the ND filter actuator 110, and thus, it does not require a large current compared to the shutter and thus can operate sufficiently.

Although in the above description, an ND filter is used for a light amount control unit, the description can apply to an iris diaphragm or a round diaphragm.

The optical lens barrel according to the present embodiment includes a front optical lens group (first lens group 1), an intermediate optical lens group (second lens group 2), and a rear optical lens group (third lens group 3), and an image stabilization unit adapted to move an image of a subject slightly.

The optical lens barrel also includes the lens barriers 12 adapted to open/close by moving between the position to cover the front surface of the first lens group and the position to retract, and a barrier actuating member (drive ring 13) adapted to drive the lens barriers 12 to open/close. Furthermore, the optical lens barrel includes a barrier drive cam section (drive cam 7a) adapted to make the barrier actuating member turn around the optical axis upon relative movement of the first, second and third lens barrels.

Furthermore, the optical lens barrel includes a first drive source (actuator 109) adapted to drive a shutter unit (the shutter fins 121 and 122) adapted to open/close by moving between the position to block a light flux passing through the optical lenses and the position to retract. Furthermore, the optical lens barrel includes a second drive source (actuator 110) adapted to drive a light amount control unit (ND filter 124) adapted to increase/decrease the light amount of a light flux for adjustment.

Furthermore, the optical lens barrel includes a third drive source (the magnets 103A and 103B, and the coil units 107A and 107B) adapted to drive the image stabilization unit. The image stabilization unit includes the second lens group holder 102, the tension springs 104, the balls 105, the sensor holder 108 and the Hall effect devices 113A and 113B. Furthermore, the optical lens barrel includes the third lens group clearance sections 101a and 101b provided to avoid interference with the unit for moving the third lens group during the lens barrel being housed.

These components are arranged circumferentially, and a barrier clearance section (120) adjacent to the first drive source (109) or the second drive source (110) to avoid interference with the barrier actuating member and the barrier drive cam section is secured.

The image stabilization unit includes a lens holding frame (second lens group holder 102) adapted to hold the optical lens group 2 adapted to perform image stabilization, and the barrier clearance section 120 is arranged overlapping the lens holding frame in a radial direction with the optical axis as the center.

Second Embodiment

Figure 13:
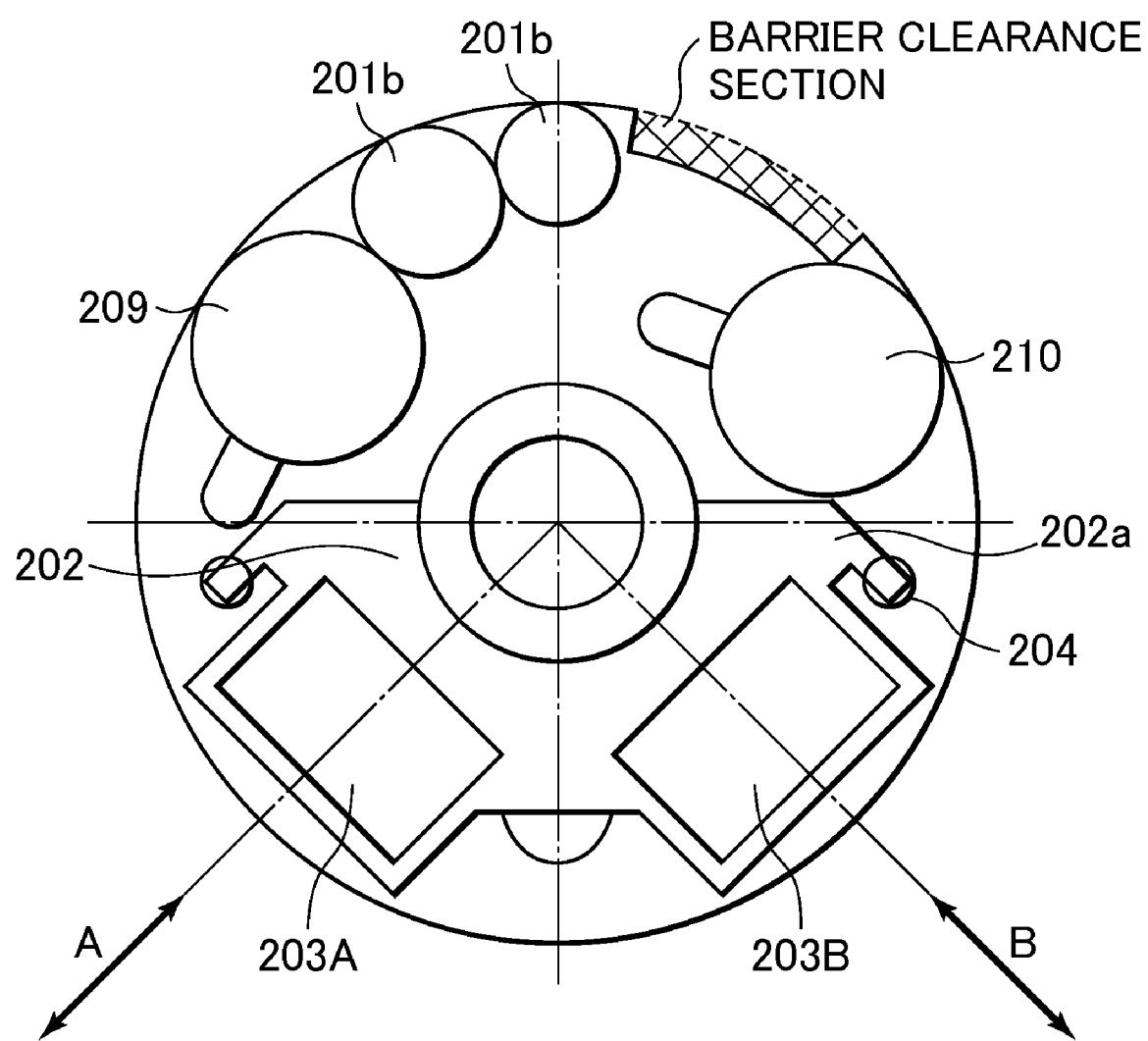
FIG. 13 is a schematic plan view of a second barrel taken out of a lens barrel according to a second embodiment of the present invention.

A second embodiment will be described with reference to FIG. 13. FIG. 13 is a schematic plan view of a second barrel taken from a lens barrel according to the second embodiment.

Third lens group clearance sections 201a and 201b, which are clearance sections for a focus feed screw and a focus guide bar, are formed above the optical axis of a lens holder 202 that holds an image-stabilizing lens. Also, hooks 202a that are locked with springs 204 are formed at the lens holder 202. Also, the lens holder 202 is provided with magnets 203A and 203B, a shutter actuator 209 and an ND actuator 210, which are integrally held by the lens holder 202. Description of the functions of the parts will be omitted because they are the same as in the first embodiment.

As indicated by cross-hatching in FIG. 13, the region of a clearance section for a drive cam and an arm (barrier clearance section) is secured between the third lens group clearance sections 201a and 201b and the ND actuator 210. Unlike the first embodiment, the barrier clearance section does not overlap with the lens holder in a radial direction, and thus, the barrier clearance section can be enlarged slightly in a radial direction compared to the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-011662, filed on Jan. 22, 2008, which is hereby incorporated by reference herein in its entirety.

What is claimed is:

1. An optical lens barrel including a front barrel, an intermediate barrel and a rear barrel that hold a front optical lens group, an intermediate optical lens group and a rear optical lens group, respectively, the relative distances in the direction of an optical axis among the front barrel, the intermediate barrel and the rear barrel varying between during the optical lens barrel being housed and during shooting, the optical lens barrel comprising:

a lens barrier arranged in said front barrel and adapted to open/close by moving between a position to cover a front surface of the front lens group and a position to retract;

a barrier actuating member arranged in said front barrel and adapted to drive said lens barrier to open/close;

a barrier drive cam section adapted to make said barrier actuating member turn around the optical axis upon relative movement of said front, intermediate and rear barrels;

a first drive source arranged in said intermediate barrel and adapted to drive a shutter unit adapted to open/close by moving between a position to block a light flux passing through the respective lens groups and a position to allow the light flux to pass through;

a second drive source arranged in said intermediate barrel and adapted to drive a light amount control unit adapted to increase/decrease the light amount of the light flux for adjustment;

a third drive source arranged in said intermediate barrel and adapted to drive said intermediate lens group in a direction perpendicular to the optical axis for image stabilization;

a rear lens group clearance section formed at an outer peripheral portion of said intermediate barrel and provided to avoid interference with a mechanism that moves the rear lens group, during the optical lens barrel being housed; and a barrier clearance section formed adjacent to said first drive source or said second drive source in a peripheral portion of said intermediate barrel and provided to avoid interference with said barrier actuating member and said barrier drive cam section.

2. The optical lens barrel according to claim 1, wherein said intermediate barrel includes a lens holding frame adapted to hold said intermediate lens group, and said barrier clearance section is arranged overlapping said lens holding frame in a radial direction with the optical axis as the center.

3. The optical lens barrel according to claim 1, further comprising a power supply member adapted to supply power to said shutter unit and said light amount control unit, wherein said drive source for said shutter unit is connected to an end of said power supply member and said drive source for said light amount control unit is connected to another end of said power supply member, and said barrier clearance section is adjacent to said drive source for said light amount control unit.

4. An image pickup apparatus comprising the optical lens barrel according to claim 1.

* * * * *